US006811886B1

(12) United States Patent
Speith-Herfurth et al.

(10) Patent No.: US 6,811,886 B1
(45) Date of Patent: Nov. 2, 2004

(54) MULTI-LAYER BIAXIALLY ORIENTED POLYPROPYLENE FILM HAVING AN IMPROVED BARRIER, A METHOD FOR THE PRODUCTION THEREOF, AND THE USE THEREOF

(75) Inventors: Angela Speith-Herfurth, Egelbach (DE); Stefan Bunk, Puttlingen (DE); Robert Hansohn, Kirkel (DE)

(73) Assignee: Hoechst Trepaphan GmbH (DE)

( * ) Notice: Subject to any disclaimer, the term of this patent is extended or adjusted under 35 U.S.C. 154(b) by 0 days.

(21) Appl. No.: 09/762,572
(22) PCT Filed: Aug. 11, 1999
(86) PCT No.: PCT/EP99/05910
§ 371 (c)(1), (2), (4) Date: Feb. 8, 2001
(87) PCT Pub. No.: WO00/09329
PCT Pub. Date: Feb. 24, 2000

(30) Foreign Application Priority Data

Aug. 13, 1998 (DE) .......................... 198 36 657

(51) Int. Cl.$^7$ .............................. B32B 27/32
(52) U.S. Cl. ............... 428/516; 428/34.9; 428/355 EN; 264/174.15
(58) Field of Search ............................... 428/516, 34.9, 428/355 EN; 264/173.15

(56) References Cited

U.S. PATENT DOCUMENTS

| | | | |
|---|---|---|---|
| 5,141,801 A | | 8/1992 | Takeshita et al. ........... 428/348 |
| 5,254,394 A | * | 10/1993 | Bothe et al. ................. 428/212 |
| 6,159,612 A | * | 12/2000 | Chu et al. ................. 428/476.1 |
| 6,270,912 B1 | * | 8/2001 | Peet ......................... 264/210.1 |
| 6,312,825 B1 | * | 11/2001 | Su et al. ................. 264/173.15 |
| 2002/0071960 A1 | * | 6/2002 | Peiffer et al. ............... 428/516 |

FOREIGN PATENT DOCUMENTS

| | | |
|---|---|---|
| EP | 0 594 083 | 4/1994 |
| WO | WO96/27491 | 9/1996 |
| WO | WO99/03673 | 1/1999 |
| WO | WO99/10172 | 3/1999 |

OTHER PUBLICATIONS

Amtsgericht, 66538 Neunkirchen, Handelregister, Abteilung B, Nummer 1962, HR No. 33 Fotokopie—Titelblatt—Handelregister.

* cited by examiner

Primary Examiner—D. Lawrence Tarazano
(74) Attorney, Agent, or Firm—Dicksinson Wright PLLC

(57) ABSTRACT

The invention relates to a multi-layer, sealable, biaxially oriented polypropylene film having improved barrier properties which is constructed of a base layer, of at least one sealable covering layer and of at least one intermediate layer. The intermediate layer contains a wax with an average molecular weight Mn ranging from 200 to 1200. The invention also relates to a method for producing the film and to the use thereof.

19 Claims, No Drawings

MULTI-LAYER BIAXIALLY ORIENTED POLYPROPYLENE FILM HAVING AN IMPROVED BARRIER, A METHOD FOR THE PRODUCTION THEREOF, AND THE USE THEREOF

FIELD OF THE INVENTION

The invention relates to a multilayer, biaxially oriented polypropylene film comprising a base layer and at least one heat-sealable top layer and at least one interlayer in accordance with a BZD layer structure, which film comprises wax in its interlayer.

BACKGROUND OF THE INVENTION

The improvement in the barrier properties of films, in particular of films for the packaging sector, has recently increased in importance. For cost and environmental reasons, the packaging industry desires ever thinner films which have the same or improved barrier properties, in particular with respect to the passage of water vapor.

The barrier action of BOPP films to water vapor (VWBA) and oxygen (OBA) decreases with the film thickness. In the usual thickness range of BOPP films (from 4 to 100 $\mu$m) there is an approximately hyperbolic relationship between the water vapor barrier action (WVBA) and the thickness (d) (WVBA×d=const). The constant depends essentially on the raw material composition and the stretching conditions. For BOPP packaging films in accordance with the prior art the constant has a value of approximately: const.=28 g×mm/m$^2$×d. The water vapor permeability here has been measured in accordance with DIN 53 122.

U.S. Pat. No. 4,921,749 (EP-A-0 247 898) describes a heat-sealable BOPP film having improved mechanical and optical properties. The heat-sealability of the film and the water vapor and oxygen permeability are likewise improved. All the improvements result from the addition of a low-molecular-weight resin to the base layer. The resin content here is between 3 and 30% by weight The resin has a molecular weight of significantly less than 5000, preferably less than 1000, and is, for example, 600. The softening point of the resin is from 120 to 140° C.

U.S. Pat. No. 5,155,160 describes the improvement in the barrier properties by the addition of wax to unoriented polypropylene films. The waxes described are paraffin waxes and polyethylene waxes having a molecular weight of from 300 to 800. The barrier action is said to be less than 0.2 g/100 square inches/24 hours.

There is a continuous demand for a further improvement in the water vapor barrier action of biaxially oriented packaging films made from polypropylene. The methods disclosed hitherto fail to reduce the water vapor barrier action to the desired extent or impair other essential film properties in an unacceptable manner.

OBJECTS OF THE INVENTION

The object of the present invention was therefore to provide a biaxially oriented polypropylene film which is distinguished by a good barrier action, in particular to water vapor, and has good mechanical properties. It must be possible to produce the film with reliable running and operation at production speeds of up to 400 m/min. Other physical film properties required in view of their use as packaging film must not be adversely affected. The film should have high gloss, no optical defects in the form of fisheyes or bubbles, good scratch resistance, fault-free running on high-speed packaging machines at low film thickness, and, for transparent embodiments, low film haze. In addition, the heat-sealing properties must not be adversely affected.

This object is achieved in accordance with the invention by a multilayer polypropylene film of the generic type mentioned at the outset, wherein the interlayer comprises a wax having a mean molecular weight (number average) of from 200 to 1200.

SUMMARY OF THE INVENTION

In a preferred embodiment, the film consists of a base layer B, interlayers Z applied to both sides thereof, and top layers D applied to the interlayers, i.e., a five-layer symmetrical structure DZBZD. In a further preferred embodiment, the film consists of a base layer B, an interlayer Z applied to one side thereof, and top layers D applied to the base layer and the interlayer In accordance with DBZD. If desired, these basic structures comprising three, four or five layers may contain further interlayers.

The base layer of the film generally comprises at least 70 to 100% by weight, preferably from 75 to 98% by weight, in particular from 80 to 95% by weight, in each case based on the base layer, of a propylene polymer described below.

This propylene polymer comprises at least 90% by weight, preferably from 94 to 100% by weight, in particular from 98 to 100% by weight, of propylene. The corresponding comonomer content of at most 10% by weight or from 0 to 6% by weight or from 0 to 2% by weight respectively generally consists, if present, of ethylene. The data in percent by weight in each case relate to the propylene homopolymer.

Of the above-mentioned propylene polymers, isotactic propylene homopolymers are preferred for the base layer. In general, the propylene homopolymer has a melting point of from 140 to 170° C., preferably from 150 to 165° C., and a melt flow index (measurement DIN 53 735 at a load of 21.6 N and 230° C.) of from 1.5 to 20g/10 min, preferably from 2 to 15g/10 min. The n-heptane-soluble content of the polymer is generally from I to 6% by weight, based on the polymer.

In a preferred embodiment of the invention, the propylene homopolymer employed is highly isotactic. For highly isotactic propylene homopolymers of this type, the chain isotacticity index of the n-heptane-insoluble content of the polypropylene, determined by $^{13}$C-NMR spectroscopy, is at least 95%, preferably from 96 to 99%.

In a further preferred embodiment of the film according to the invention, the propylene homopolymer of the base layer has been peroxidically degraded.

DETAILED DESCRIPTION OF THE INVENTION

A measure of the degree of degradation of the polymer is the so-called degradation factor A, which indicates the relative change in the melt flow index measured in accordance with DIN 53 735, of the polypropylene, based on the starting polymer.

$$A = \frac{MFI_2}{MFI_1}$$

MFI$_1$=melt flow index of the propylene polymer before addition of the organic peroxide MFI$_2$=melt flow index of the peroxidically degraded propylene polymer In general, the degradation factor A of the propylene polymer employed is in the range from 1.5 to 15, preferably from 1.5 to 10.

Particularly preferred organic peroxides are dialkyl peroxides, where the term alkyl radical is taken to mean the conventional saturated straight-chain or branched lower alkyl radicals having up to six carbon atoms. Particular preference is given to 2,5-dimethyl-2,5-di(t-butylperoxy) hexane and di-t-butyl peroxide.

In general, the base layer comprises conventional stabilizers and neutralizers in effective amounts in each case, and also, if desired, an antistatic and/or hydrocarbon resin. All amounts in % by weight below relate to the weight of the base layer.

Stabilizers which can be employed are the conventional stabilizing compounds for polymers of ethylene, propylene and other olefins. Their added amount is between 0.05 and 2% by weight. Particularly suitable are phenolic stabilizers, phosphitic stabilizers, alkali metal/alkaline earth metal stearates and/or alkali metal/alkaline earth metal carbonates. Preference is given to phenolic stabilizers in an amount from 0.1 to 0.6% by weight, in particular from 0.15 to 0.3% by weight, and having a molecular weight of greater than 500 g/mol. Pentaerytrityl tetrakis-3-(3,5-di-tert-butyl-4-hydroxyphenyl)propionate and 1,3,5-trimethyl-2,4,6-tris(3, 5-di-tert-butyl-4-hydroxybenzyl)benzene are particularly advantageous.

Neutralizers are preferably dihydrotalcite, calcium stearate and/or calcium carbonate having a mean particle size of at most 0.7 $\mu$m, an absolute particle size of less than 10 $\mu$m and a specific surface area of at least 40 m$^2$/g. In general, the film comprises from 0.02 to 2% by weight, preferably from 0.03 to 1% by weight, of neutralizer.

Preferred antistatics are the essentially straight-chain and saturated aliphatic, tertiary amines containing an aliphatic radical having 10 to 20 carbon atoms which are substituted by $\omega$-hydroxy-(C$_1$–C$_4$)alkyl groups, where N,N-bis(2-hydroxyethyl)alkylamines having 10 to 20 carbon atoms, preferably 12 to 18 carbon atoms, in the alkyl radical are particularly suitable. Also suitable as antistatics are monoesters of glycerol and aliphatic fatty acids, preference being given to fatty acid radicals having 10 to 20 carbon atoms. Glycerol monostearate is particularly preferred.

The resin-modified embodiments comprise the resin in an amount of from 1 to 20% by weight, preferably from 1 to 12% by weight, in particular from 1 to 10% by weight, based on the weight of the base layer.

Hydrocarbon resins are low-molecular-weight polymers whose mean molecular weight (weight average) is generally in the range from 300 to 6000, preferably from 400 to 5000, preferably from 500 to 2000. The mean molecular weight of the resins is thus significantly lower than that of the propylene polymers which form the principal component of the individual film layers and generally have a mean molecular weight of greater than 100,000.

Preferred resins are hydrocarbon resins which have, if desired, been partially or preferably fully hydrogenated. Suitable hydrocarbon resins are basically synthetic resins or resins of natural origin, which are generally partially or fully hydrogenated. It has proven particularly advantageous to employ resins having a softening point of >80° C. (measured in accordance with DIN 1995-U4 or ASTM E-28), preference being given to those having a softening point of from 100 to 180° C., in particular from 120 to 160° C.

Of the numerous resins, preference is given to hydrocarbon resins in the form of petroleum resins, styrene resins, cyclopentadiene resins and terpene resins (these resins are described in Ullmanns Encyklopädie der techn. Chemie [Ullmann's Encyclopaedia of Industrial Chemistry], 4th Edition, Volume 12, pages 525 to 555).

The petroleum resins are hydrocarbon resins prepared by polymerization of deep-decomposed petroleum materials in the presence of a catalyst. These petroleum materials usually comprise a mixture of resin-forming substances, such as styrene, methylstyrene, vinyltoluene, indene, methylindene, butadiene, isoprene, piperylene and pentylene. The styrene resins are homopolymers of styrene or copolymers of styrene with other monomers, such as methylstyrene, vinyltoluene or butadiene. The cydopentadiene resins are cyclopentadiene homopolymers or cyclopentadiene copolymers obtained from coal tar distillates and fractionated petroleum gas. These resins are prepared by keeping the materials containing cydopentadiene at high temperature for a long period of time. Depending on the reaction temperature, dimers, trimers or oligomers can be obtained.

The terpene resins are polymers of terpenes, i.e., hydrocarbons of the formula $C_{10}H_{16}$, which are present in virtually all essential oils or oil-containing resins from plants, and phenol-modified terpene resins. Specific examples of terpenes which may be mentioned are pinene, $\alpha$-pinene, dipentene, limonene, myrcene, camphene and similar terpenes. The hydrocarbon resins can also be so-called modified hydrocarbon resins. The modification is generally carried out by reaction of the raw materials before the polymerization, by the introduction of specific monomers or by reaction of the polymerized product, in particular by hydrogenation or partial hydrogenation.

The hydrocarbon resins employed are furthermore styrene homopolymers, styrene copolymers, cyclopentadiene homopolymers, cyclopentadiene copolymers and/or terpene polymers having a softening point of in each case above 120° C. (in the case of unsaturated polymers, the hydrogenated product is preferred). Very particular preference is given to the use of cyclopentadiene polymers having a softening point of at least 125° C. or copolymers of $\alpha$-methylstyrene and vinyltoluene having a softening point of from 110 to 160° C. in the base layer.

In a white or opaque or white/opaque embodiment of the film according to the invention, the base layer additionally comprises pigments and/or vacuole-initiating particles. Such films have a light transparency, measured in accordance with ASTM-D 103377, of at most 50%, preferably of at most 70%.

Pigments cover particles which essentially do not result in vacuole formation when the film is stretched. The coloring action of the pigments is caused by the particles themselves. The term "pigment" is generally associated with a particle size in the range from 0.01 to a maximum of 1 $\mu$m and covers both so-called "white pigments", which color the films white, and "colored pigments". The base layer generally comprises pigments in an amount of from 1 to 25% by weight, preferably from 2 to 15% by weight, in each case based on the base layer.

Conventional pigments are materials such as, for example, aluminum oxide, aluminum sulfate, barium sulfate, calcium carbonate, magnesium carbonate, silicates, such as aluminum silicate (kaolin clay) and magnesium silicate (talc), silicon dioxide and titanium dioxide, of which white pigments, such as calcium carbonate, silicon dioxide, titanium dioxide and barium sulfate, are preferably employed.

Opaque embodiments of the films comprise vacuole-initiating particles, which are incompatible with the polymer matrix and result in the formation of vacuole-like cavities when the films are stretched, with the size, nature and number of the vacuoles being dependent on the size of the solid particles and the stretching conditions, such as stretching ratio and stretching temperature. The vacuoles give the films a characteristic pearl-like opaque appearance caused by light scattering at the vacuole/polymer matrix interfaces. In general, the mean particle diameter of the vacuole-initiating particles is from 1 to 6 µm, preferably from 1.5 to 5 µm. The base layer generally comprises vacuole-initiating particles in an amount of from 1 to 25% by weight.

Conventional vacuole-initiating particles of the base layer are inorganic and/or organic, polypropylene-incompatible materials, such as aluminum oxide, aluminum sulfate, barium sulfate, calcium carbonate, magnesium carbonate, silicates, such as aluminum silicate (kaolin clay) and magnesium silicate (talc), silicon dioxide and titanium dioxide, of which calcium carbonate, silicon dioxide and titanium dioxide are preferably employed. Suitable organic fillers are conventional polymers which are incompatible with the polymer of the base layer, in particular those such as HDPE, polyesters, polystyrenes, polyamides and halogenated organic polymers, preference being given to polyesters, such as, for example, polybutylene terephthalate and polyethylene terephthalate. For the purposes of the present invention, "incompatible materials or incompatible polymers" means that the material or polymer is present in the film in the form of a separate particle or separate phase.

White/opaque films provided with vacuole-initiating particles and with pigments generally comprise the vacuole-initiating particles in an amount of from 1 to 10% by weight, preferably from 1 to 5% by weight, and pigments in an amount of from 1 to 7% by weight, preferably from 1 to 5% by weight.

The density of the opaque or white films can vary within broad limits and depends on the nature and amount of the fillers. The density is generally in the range from 0.4 to 1.1 g/cm³. Pigmented films have a density in the order of 0.9 g/cm³ or above, preferably in the range from 0.9 to 1.1 g/cm³. Films comprising only vacuole-initiating particles have a density of less, than 0.9 g/cm³. For packaging films having a content of vacuole-initiating particles of from 2 to 5% by weight, the density is in the range from 0.6 to 0.85 g/cm³. For films having a content of vacuole-initiating particles of from 5 to 14% by weight, the density is in the range from 0.4 to 0.8 g/cm³. Films which comprise pigments and vacuole-initiating particles have a density in the range from 0.5 to 0.85 g/cm³, depending on the ratio of pigment content to content of vacuole-initiating particles.

The polypropylene film according to the invention furthermore comprises at least one interlayer of polymers made from olefins having 2 to 10 carbon atoms applied to the base layer.

Examples of olefinic polymers of this type are
  a propylene homopolymer or
  a copolymer of
    ethylene and propylene or
    ethylene and 1-butylene or
    propylene and 1-butylene or
  a terpolymer of
    ethylene and propylene and 1-butylene or
  a mixture of two or more of said homopolymers, copolymers and terpolymers or
  a blend of two or more of said homopolymers, copolymers and terpolymers, if desired mixed with one or more of said homopolymers, copolymers and terpolymers, where particular preference is given to propylene homopolymer or
  random ethylene-propylene copolymers having
    an ethylene content of from 1 to 10% by weight, preferably from 2.5 to 8% by weight, or
  random propylene-1-butylene copolymers having
    a butylene content of from 2 to 25% by weight, preferably from 4 to 20% by weight,
  in each, case based on the total weight of the copolymer, or
  random ethylene-propylene-1-butylene terpolymers having
    an ethylene content of from 1 to 10% by weight, preferably from 2 to 6% by weight, and
    a 1-butylene content of from 2 to 20% by weight, preferably from 4 to 20% by weight,
  in each case based on the total weight of the terpolymer, or
  a blend of an ethylene-propylene-1-butylene terpolymer and a propylene-1-butylene copolymer
    having an ethylene content of from 0.1 to 7% by weight and a propylene content of from 50 to 90% by weight and a 1-butylene content of from 10 to 40% by weight, in each case based on the total weight of the polymer blend.

The propylene homopolymer employed in the interlayer comprises predominantly (at least 98%) propylene and has a melting point of 140° C. or above, preferably from 150 to 170° C., preference being given to isotactic homopolypropylene having an n-heptane-soluble content of 6% by weight or less, based on the isotactic homopolypropylene. The homopolymer generally has a melt flow index of from 1.5 g/10 min to 20 g/10 min, preferably from 2.0 g/10 min to 15 g/10 min. In a preferred embodiment of the invention, the propylene homopolymer employed in the interlayer is highly isotactic. For highly isotactic propylene homopolymers of this type, the chain isotacticity index of the n-heptane-insoluble content of the polypropylene, determined by $^{13}$C-NMR spectroscopy, is at least 95%, preferably from 96 to 99%.

The above-described copolymers and/or terpolymers employed in the inter-layer generally have a melt flow index of from 1.5 to 30 g/10 min, preferably from 3 to 15 g/10 min. The melting point is in the range from 120 to 140° C. The above-described blend of copolymers and terpolymers has a melt flow index of from 5 to 9 g/10 min and a melting point of from 120 to 150° C. All the above-mentioned melt flow indices are measured at 230° C. and a force of 21.6 N (DIN 53 735).

If desired, all the interlayer polymers described above may have been peroxidically degraded in the same manner as described above for the base layer, basically using the same peroxides. The degradation factor for the interlayer polymers is generally in the range from 1.5 to 15, preferably from 1.5 to 10.

In accordance with the invention, the film comprises in its interlayer a wax for improving the water vapor barrier action it has been found that the desired barrier action is particularly effective if the amount of wax is not less than a certain minimum amount, based on the total weight of the film, this minimum amount being dependent, inter alia, on the film thickness.

Films having a total thickness of up to 25 µm should advantageously comprise at least 0.5% by weight of wax, based on the weight of the film. Films having a total thickness of >25 to 60 µm should advantageously comprise at least 0.2% by weight of wax, based on the weight of the film. Films having a total thickness of >60 μm should advantageously comprise at least 0.1% by weight of wax, based on the weight of the film.

This advantageous amount of wax selected depending on the film thickness is, in accordance with the invention, added to the interlayer(s). Surprisingly, it is thereby possible to greatly reduce the absolute amount of wax in the film in order to achieve good barrier values. An impairment of other film properties is thereby avoided.

The above-mentioned minimum amounts of wax based on the weight of the film can be set to the most effective range either through the corresponding concentration of wax in the interlayer or through a varying thickness of the interlayer for a given wax concentration. Thus, both the wax concentration in the interlayer and the thickness of the interlayer can be varied in broad ranges, although these two parameters cannot be selected entirely independently of one another. It must be ensured that the advantageous minimum amounts of wax, based on the film, are achieved.

The interlayer generally comprises from 3 to 40% by weight, preferably from 5 to 30% by weight, of wax, based on the weight of the interlayer, where, as already emphasized, the amount of wax must advantageously be selected in such a way that the film—as described above—comprises in total the minimum amount of wax depending on its total thickness.

The thickness of the interlayer is generally in the range from 0.2 to 10 μm, preferably in the range from 0.4 to 5 μm, in particular in the range from 0.5 to 3 μm, the thickness of the interlayer being selected in accordance with the criteria explained above.

For the purposes of the present invention, waxes cover polyethylene waxes and/or paraffins (macrocrystalline and microcrystalline paraffins) having a mean molecular weight (number average) of from 200 to 1200.

Polyethylene waxes are low-molecular-weight polymers which are essentially built up from ethylene units and are partly or highly crystalline. The polymer chains containing the ethylene units are elongated molecules which may be branched, with relatively short side chains predominating. In general, polyethylene waxes are prepared by direct polymerization of ethylene, if desired with use of regulators, or by depolymerization of polyethylenes of relatively high molecular weight. In accordance with the invention, the polyethylene waxes have a mean molecular weight Mn (number average) of from 200 to 1200, preferably from 400 to 600, and preferably have a molecular weight distribution (polydispersity) Mw/Mn of less than 2, preferably from 1 to 1.5. The melting point is generally in the range from 70 to 150° C., preferably from 80 to 100° C.

Paraffins cover macrocrystalline paraffins (paraffin waxes) and microcrystalline paraffins (microwaxes) having a mean molecular weight (number average) of from 200 to 1200. The macrocrystalline paraffins are obtained from vacuum distillate fractions on conversion thereof into lubricating oils. Microcrystalline paraffins originate from the residues of vacuum distillation and the sediments of paraffinic crude oils (deposition paraffins). Macrocrystalline paraffins consist predominantly of n-paraffins which additionally contain isoparaffins, naphthenes and alkylaromatic compounds, depending on the degree of refining. Microcrystalline paraffins consist of a mixture of hydrocarbons which are predominantly solid at room temperature. In contrast to the case in macrocrystalline paraffins, isoparaffins and naphthenic paraffins predominate. Microcrystalline paraffins are distinguished by the presence of crystallization-inhibiting, highly branched isoparaffins and naphthenes. For the purposes of the invention, paraffins having a melting point of from 60 to 100° C., preferably from 60 to 85° C., are particularly suitable.

It has been found that the waxes only develop the desired barrier-improving action in the interlayer if the mean molecular weight (number average) is in the range from 200 to 1200. Although waxes having a higher molecular weight improve the slip properties of a film, they do not have an effect on the barrier action of the film.

In addition to the wax which is essential to the invention, the interlayer may comprise further conventional additives, such as, for example, the neutralizers, stabilizers and antistatics described above for the base layer and conventional lubricants, in effective amounts in each case.

Lubricants are higher aliphatic acid amides, higher aliphatic acid esters and metal soaps, as well as silicone oils. The addition of higher aliphatic acid amides and silicone oils is particularly suitable. Aliphatic acid amides are amides of a water-insoluble monocarboxylic acid having 8 to 24 carbon atoms, preferably from 10 to 18 carbon atoms. Erucamide, stearamide and oleamide are preferred. Suitable silicone oils are polydialkylsiloxanes, preferably polydimethylsiloxane, polymethylphenylsiloxane, olefin-modified silicone, polyether-modified silicone, such as, for example, polyethylene glycol and polypropylene glycol, and epoxyamino and alcohol-modified silicone. The viscosity of the suitable silicone oils is in the range from 5000 to 1,000,000 mm$^2$/s. Polydimethylsiloxane having a viscosity of from 10,000 to 100,000 mm$^2$/s is preferred.

For the opaque embodiments of the invention, it must be noted that the interlayer should not comprise any vacuole-initiating fillers in order to prevent vacuoles being formed in the interlayer during stretching of the film. It has been found that the advantages of the invention are impaired in the case of a vacuole-containing interlayer, i.e., that the waxes do not develop their action in the intended manner and extent in the vacuole-containing interlayer. In particular, the increased barrier action to water vapor is no longer ensured. It is therefore essential for opaque embodiments of the invention that the interlayer comprises no vacuoles.

If desired, however, the interlayer in the opaque embodiment of the film may additionally comprise pigments which essentially generate no vacuoles.

The pigments employed are the particles described above as pigments for the base layer, TiO$_2$ being particularly preferred as pigment for the interlayer. The interlayer generally comprises from 1 to 20% by weight, preferably from 2 to 10% by weight, of pigments, in each case based on the weight of the interlayer.

The polypropylene film according to the invention furthermore includes top layers, applied to both sides, comprising polymers of olefins having 2 to 10 carbon atoms.

Examples of olefinic polymers of this type are a propylene homopolymer or a copolymer of ethylene and propylene or ethylene and 1-butylene or propylene and 1-butylene or a terpolymer of ethylene and propylene and 1-butylene or a mixture of two or more of said homopolymers, copolymers and terpolymers or a blend of two or more of said homopolymers, copolymers and terpolymers, if desired mixed with one or more of said homopolymers, copolymers and terpolymers, where particular preference is given to propylene homopolymer or random ethylene-propylene copolymers having
an ethylene content of from 1 to 10% by weight, preferably from 2.5 to 8% by weight, or random propylene-1-butylene copolymers having
a butylene content of from 2 to 25% by weight, preferably from 4 to 20% by weight, in each case based on the total weight of the copolymer, or random ethylene-propylene-1-butylene terpolymers having
an ethylene content of from 1 to 10% by weight, preferably from 2 to 6% by weight, and
a 1-butylene content of from 2 to 20% by weight, preferably from 4 to 20% by weight,
in each case based on the total weight of the terpolymer, or a blend of an ethylene-propylene-1-butylene terpolymer and a propylene-1-butylene copolymer
having an ethylene content of from 0.1 to 7% by weight and a propylene content of from 50 to 90% by weight and a 1-butylene content of from 10 to 40% by weight, in each case based on the total weight of the polymer blend.

The propylene homopolymer employed in the top layer of non-heat-sealable embodiments of the film comprises predominantly (at least 98%) propylene and has a melting point of 140° C. or above, preferably from 150 to 170° C., preference being given to isotactic homopolypropylene having an n-heptane-soluble content of 6% by weight or less, based on the isotactic homopoly-propylene. The homopolymer generally has a melt flow index of from 1.5 g/10 min to 20 g/10 min, preferably from 2.0 g/10 min to 15 g/10 min.

The above-described copolymers or terpolymers employed in the top layer of heat-sealable embodiments of the film generally have a melt flow index of from 1.5 to 30 g/10 min, preferably from 3 to 15 g/10 min. The melting point is in the range from 120 to 140° C. The above-described blend of copolymers and terpolymers has a melt flow index of from 5 to 9 g/10 min and a melting point of from 120 to 150° C. All the melt flow indices indicated above are measured at 230° C. and a force of 21.6 N (DIN 53 735).

If desired, all top-layer polymers described above may have been peroxidically degraded in the same manner as described above for the base layer, basically the same peroxides being used. The degradation factor for the top-layer polymers is generally in the range from 1.5 to 15, preferably from 1.5 to 10.

In a matt embodiment, the top layer additionally comprises a high density polyethylene (HDPE), which is mixed or blended with the top-layer polymers described above. The composition and details of the matt top layers are described, for example, in German patent application P 43 13 430.0, which is expressly incorporated herein by way of reference.

The top layers may, as described above for the base layer and interlayer, comprise stabilizers, neutralizers, lubricants, antiblocking agents and/or antistatics in the corresponding amounts. In a preferred embodiment, the top layers comprise antiblocking agents described below.

Suitable antiblocking agents are inorganic additives, such as silicon dioxide, calcium carbonate, magnesium silicate, aluminum silicate, calcium phosphate and the like, and/or incompatible organic polymers, such as polyamides, polyesters, polycarbonates and the like, preference being given to benzoguanamine-formaldehyde polymers, silicon dioxide and calcium carbonate. The effective amount of antiblocking agent, preferably $SiO_2$, is in the range from 0.1 to 2% by weight, preferably from 0.1 to 0.8% by weight, in each case based on the weight of the top layer. The mean particle size is between 1 and 6 µm, in particular between 2 and 5 µm, particles having a spherical shape, as described In EP-A-0 236 945 and DE-A-38 01 535, being particularly suitable.

The thickness of the top layer(s) is generally greater than 0.2 µm and is preferably in the range from 0.4 to 2 µm, in particular from 0.5 to 1.5 µm.

The total thickness of the polypropylene film according to the invention can vary within broad limits and depends on the intended use. For transparent embodiments, it is preferably from 4 to 80 µm, preferably from 5 to 50 µm, in particular from 10 to 30 µm. Opaque/white embodiments generally have a thickness of from 10 to 150 µm, preferably from 15 to 100 µm, in particular from 20 to 80 µm, the base layer making up from about 40 to 95% of the total film thickness.

The invention furthermore relates to a process for the production of the polypropylene film according to the invention by the coextrusion process, which is known per se.

As is conventional in the coextrusion process, the polymer or polymer mixture of the individual layers is firstly compressed and liquefied in an extruder, it being possible for any additives added already to be present in the polymer or polymer mixture. The melts are then forced simultaneously through a flat-film die (slot die), and the extruded multilayer film is taken off on one or more take-off rolls, during which it cools and solidifies.

The film obtained in this way is then stretched longitudinally and transversely to the extrusion direction, which results in alignment of the molecule chains. The longitudinal stretching is advantageously carried out with the aid of two rolls running at different speeds corresponding to the desired stretching ratio, and the transverse stretching with the aid of an appropriate tenter frame. The longitudinal stretching ratios are in the range from 5.0 to 9, preferably from 5.5 to 8.5. The transverse stretching ratios are in the range from 5.0 to 9.0, preferably from 6.5 to 9.0.

The biaxial stretching of the film is followed by heat-setting (heat treatment) thereof, during which the film is held at a temperature from 60 to 160° C. for from about 0.1 to 20 seconds. The film is subsequently wound up in a conventional manner by means of a wind-up unit.

It has proven particularly favorable to keep the takeoff roll or rolls, by means of which the extruded film is cooled and solidified, at a temperature from 10 to 100° C., preferably from 20 to 70° C., by means of a heating and cooling circuit.

The temperatures at which longitudinal and transverse stretching are carried out can vary in a relatively broad range and depend on the desired properties of the film. In general, the longitudinal stretching is carried out at from 80 to 150° C. and the transverse stretching is preferably carried out at from 120 to 170° C.

After the biaxial stretching, one or both surfaces of the film is/are preferably corona- or flame-treated by one of the known methods. The treatment intensity is generally in the range from 36 to 50 mN/m, preferably from 38 to 45 mN/m.

In the case of corona treatment, an advantageous procedure is to pass the film, between two conductor elements serving as electrodes, with such a high voltage, usually an alternating voltage (from about 5 to 20 kV and from about 5 to 30 kHz), being applied between the electrodes that spray or corona discharges can occur. Due to the spray or corona discharge, the air above the film surface ionizes and reacts with the molecules of the film surface, resulting in the formation of polar inclusions in the essentially nonpolar polymer matrix:

For flame treatment with a polarized flame (see U.S. Pat. No. 4,622,237), a direct electric voltage is applied between a burner (negative pole) and a chill roll. The level of the applied voltage is between 400 and 3000 V, preferably in the range from 500 to 2000 V. The applied voltage gives the Ionized atoms increased acceleration, and they hit the polymer surface with greater kinetic energy. The chemical bonds within the polymer molecule are broken more easily, and formation of free radicals proceeds more rapidly. The thermal load on the polymer is much less here than in the case of standard flame treatment, and films can be obtained in which the heat-sealing properties of the treated side are even better than those of the untreated side.

The multilayer film according to the invention is distinguished by its good barrier action against water vapor. It has been found that incorporation of wax in the interlayer is advantageous compared with a synergistic combination of resin and wax in the base layer. Firstly, an excellent improvement in the barrier action can be achieved with a comparatively small absolute amount of wax Secondly, the film is extremely inexpensive to produce. The barrier values can be adjusted particularly flexibly via the concentration and the thickness of the interlayer. This facilitates particularly high flexibility to customer wishes. Surprisingly, the exclusive formulation of the interlayer with wax is sufficient to achieve a good barrier action. It has been found that additional amounts of resin in the interlayer do not effect a further improvement in the barrier action. This is all the more surprising as it has been found simultaneously with the investigations for this application that the combination of wax and resin in the base layer combines in a synergistic manner. These results, suggest the assumption that the mechanisms of action of the wax in the interlayer are different than in the base layer of an oriented film, although even today the basis for the barrier action-improving action of the wax is still not really understood.

Surprisingly, additives such as hydrocarbon resins or waxes need not additionally be added to either the base layer or the top layer in order to guarantee the desired barrier properties.

Furthermore, it has been found that other desirable service properties of the film are not impaired by the wax in the interlayer. Besides the improved barrier action, the film is also distinguished by good transparency, high gloss and good heat-sealing properties.

The invention is of major importance in the case of vacuole-containing films. In this film type, the relatively small amounts of wax in accordance with the invention can, in spite of the vacuole-containing base layer, develop a surprisingly good barrier action. Conventional vacuole-containing films in which wax has been added to the base layer require a considerably greater amount of wax compared with transparent films. Presumably, the vacuoles generate an internal surface to which the wax migrates.

The invention is explained in greater detail by the examples below.

EXAMPLE 1

A transparent five-layer film having a symmetrical DZBZD structure with a total thickness of 20 $\mu$m was produced by coextrusion of the respective raw-material mixtures and subsequent stepwise orientation in the longitudinal and transverse directions. The top layers D each had a thickness of 0.6 $\mu$m, and the interlayers Z each had a thickness of 1.5 $\mu$m. The calculated wax content based on the total weight of the film, was 1% by weight The wax content based on the total weight of the film is calculated from the wax content in the raw-material mixture of the interlayer and the thickness of the interlayer and the total thickness of the film.

Raw-material mixture of base layer B:

99.85% by wt of highly isotactic propylene homopolymer having a melting point of 166° C. and a melt flow index of 3.4 g/10 min, where the n-heptane-insoluble content had a chain isotacticity index of 98%

0.15% by wt. of N,N-bisethaxyalkylamine (antistatic)

Raw-material mixture of the interlayers Z:

93.0% by wt. of isotactic polypropylene from Solvay with the trade name ®PHP 405

7.0% by wt. of polyethylene wax having a mean molecular weight Mn of 500 and a molecular weight distribution Mw/Mn of 1.08

Raw-material mixture of the top layers D:

about 74% by wt. of random ethylene-propylene copolymer having a $C_2$ content of 4.5% by wt.

about 25% by wt. of random ethylene-propylene-butylene terpolymer having an ethylene content of 3% by weight and a butylene content of 7% by weight (remainder propylene)

0.33% by wt. of $SiO_2$ as antiblocking agent having a mean particle size of 2 $\mu$m 1.20% by wt. of polydimethylsiloxone having a viscosity of 30,000 $mm^2$/s The production conditions in the individual process steps were as follows:

| Extrusion: | temperatures | base layer: | 260° C. |
|---|---|---|---|
| | | top layers: | 240° C. |
| | | interlayer: | 260° C. |
| | temperature of the take-off roll: | | 20° C. |
| Longitudinal stretching: | temperature: | | 110° C. |
| | longitudinal stretching ratio: | | 5.5 |
| Transverse stretching: | temperature: | | 160° C. |
| | transverse stretching ratio: | | 9 |
| Setting: | temperature: | | 140° C. |
| | convergence: | | 20% |

The transverse stretching ratio $I_t=9$ is an effective value. This effective value is calculated from the final film width W, reduced by twice the hem strip width w, divided by the width of the longitudinally stretched film C, likewise reduced by twice the hem strip width w.

EXAMPLE 2

A film was produced as described in Example 1. The raw-material mixture of the interlayer now comprised 10% by weight of the same wax, corresponding to a calculated total content, based on the total weight of the film, of about 1.5% by weight The remainder of the composition and the production conditions were not changed compared with Example 1.

EXAMPLE 3

A film was produced as described in Example 1. The raw-material mixture of the interlayer now comprised 13.3% by weight of the same wax, corresponding to a calculated total content, based on the total weight of the film, of about 2% by weight The remainder of the composition and the production conditions were not changed compared with Example 1.

EXAMPLE 4

A film was produced as described in Example 1. The raw-material mixture of the interlayer now comprised 13.3% by weight of the same wax. The thickness of each interlayer was now 3 μm. Correspondingly, the calculated total wax content based on the total weight of the film, was about 4% by weight The remainder of the composition and the production conditions were not changed compared with Example 1.

EXAMPLE 5

A film was produced as described in Example 1. The raw-material mixture of the interlayer now comprised 20% by weight of the same wax, corresponding to a calculated total content based on the total weight of the film, of about 3.0% by weight. The remainder of the composition and the production conditions were not changed compared with Example 1.

EXAMPLE 6

A film was produced as described in Example 4. The raw-material mixture of the interlayer now comprised 20% by weight of the same wax corresponding to a calculated total content, based on the total weight of the film, of about 6.0% by weight The remainder of the composition and the production conditions were not changed compared with Example 4.

EXAMPLE 7

A film was produced as described in Example 1. The raw-material mixture of the interlayer now comprised 27% by weight of the same wax, corresponding to a calculated total content based on the total weight of the film, of about 4.0% by weight The remainder of the composition and the production conditions were not changed compared with Example 1.

EXAMPLE 8

A film was produced as described in Example 1. The raw-material mixture of the base layer now additionally comprised 10% by weight of a hydrocarbon resin. The remainder of the composition and the production conditions were not changed compared with Example 1.

EXAMPLE 9

A film was produced as described in Example 1. The raw-material mixture of the base layer now additionally comprised 5% by weight of a hydrocarbon resin. The remainder of the composition and the production conditions were not changed compared with Example 1.

COMPARATIVE EXAMPLE 1

A film was produced as described in Example 1. In contrast to Example 1, the film now contained no interlayer and comprised no polyethylene wax in either the base layer or in the top layer. The remainder of the composition and the production conditions were not changed compared with Example 1.

COMPARATIVE EXAMPLE 2

A film was produced as described in Comparative Example 1. The raw-material mixture of the base layer now comprised hydrocarbon resin corresponding to a calculated total content based on the total weight of the film, of 5.0% by weight The remainder of the composition and the production conditions were not changed compared with Comparative Example 1.

COMPARATIVE EXAMPLE 3

A film was produced as described in Comparative Example 1. The raw-material mixture of the base layer now comprised hydrogen resin corresponding to a calculated total content, based on the total weight of the film, of 8.0% by weight The remainder of the composition and the production conditions were not changed compared with Comparative Example 1.

COMPARATIVE EXAMPLE 4

A film was produced as described in Comparative Example 1. The raw-material mixture of the base layer now comprised hydrocarbon resin corresponding to a calculated total content, based on the total weight of the film, of 10.0% by weight The remainder of the composition and the production conditions were not changed compared with Comparative Example 1.

COMPARATIVE EXAMPLE 5

A film was produced as described in Comparative Example 1. The raw-material mixture of the base layer now comprised the same polyethylene wax as described in Example 1 corresponding to a calculated total wax content, based on the total weight of the film, of 1.0% by weight. The film contained no hydrocarbon resin. The remainder of the composition and the production conditions were not changed compared with Comparative Example 1.

COMPARATIVE EXAMPLE 6

A film was produced as described in Comparative Example 5. The raw-material mixture of the base layer now comprised the same polyethylene wax corresponding to a calculated total wax content based on the total weight of the film, of 2.0% by weight The remainder of the composition and the production conditions were not changed compared with Comparative Example 5.

COMPARATIVE EXAMPLE 7

A film was produced as described in Comparative Example 5. The raw-material mixture of the base layer now comprised the same polyethylene wax corresponding to a calculated total wax content, based on the total weight of the film, of 3.0% by weight The remainder of the composition and the production conditions were not changed compared with Comparative Example 5.

COMPARATIVE EXAMPLE 8

A film was produced as described in Comparative Example 5. The raw-material mixture of the base layer now comprised the same polyethylene wax corresponding to a calculated total wax content, based on the total weight of the film, of 4.0% by weight The remainder of the composition and the production conditions were not changed compared with Comparative Example 5.

The raw materials and films were characterized using the following measurement methods:

Melt Flow Index

The melt flow index was measured in accordance with DIN 53 735 at a load of 21.6 N and 230° C.

Melting Point

DSC measurement, maximum of the melting curve, heating rate 20° C./min.

Water Vapor and Oxygen Permeability

The water vapor permeability is determined in accordance with DIN 53 122 Part 2.

Surface Tension

The surface tension was determined by the socalled ink method (DIN 53 364).

Molecular Weight Determination

The mean molecular weights Mw and Mn and the mean molecular weight dispersity Mw/Mn were determined in accordance with DIN 55 672, Part 1, by means of gel permeation chromatography. Instead of THF, ortho-dichloro-benzene was used as eluent. Since the olefinic polymers to be investigated are insoluble at room temperature, the entire measurement is carried out at elevated temperature (>>135° C.).

Isotactic Content

The isotactic content of the homopolymer can be characterized to an approximation by means of the insoluble fraction of the raw material in n-heptane. Usually, a Soxhlet extraction with boiling n-heptane is carried out, it being advantageous to fill the Soxhlet apparatus with a pressed disk instead of granules. The thickness of the pressed disk here should not exceed 500 microns. For quantitative determination of the n-heptane-insoluble content of the homopolymer, it is of crucial importance to ensure a sufficient extraction time of from 8 to 24 hours.

The operational definition of the isotactic content $PP_{iso}$ in percent is given by the ratio of the weights of the dried n-heptane-insoluble fraction to the sample weight:

$$PP_{iso}=100\times(\text{n-heptane-insoluble fraction/sample weight})$$

An analysis of the dried n-heptane extract shows that this generally does not consist of pure a tactic propylene homopolymer. In the extraction, aliphatic and olefinic oligomers, in particular isotactic oligomers, and also possible additives, such as, for example, hydrogenated hydrocarbon resins and wax are also included in the measurement.

Chain Isotacticity Index

The isotactic content $PP_{iso}$ defined above, determined as n-heptane-insoluble content, is not sufficient for characterizing the chain isotacticity of the polymer. It proves appropriate to determine the chain isotacticity index II of the homopolymer by means of high-resolution $^{13}$C-NMR spectroscopy, where the NMR sample selected should not be the original raw material, but instead its n-heptane-insoluble fraction. In order to characterize the isotacticity of polymer chains, in practice the $^{13}$C-NMR spectroscopic triad isotacticity index II (triads) is usually used.

Determination of the Triad related Chain Isotacticity Index II (Triads)

The chain isotacticity index II (triads) of the n-heptane-insoluble content of the homopolymer and of the film is determined from the $^{13}$C-NMR spectrum thereof.

The intensities of triad signals which result from the methyl groups with different local environments are compared.

With regard to the evaluation of the $^{13}$C-NMR spectrum, a distinction must be, made between two cases:

A) The raw material investigated is a propylene homopolymer without a random $C_2$ content.

B) The raw material investigated is a propylene homopolymer having a low random $C_2$ content, referred to below as $C_2$–$C_3$-copolymer.

Case A:

The chain isotacticity index of the homopolymer is determined from its $^{13}$C-NMR spectrum. The intensities of signals resulting from the methyl groups with different environments are compared. In the $^{13}$C-NMR spectrum of a homopolymer, essentially three groups of signals, so-called triads, occur.

1. At a chemical shift of from about 21 to 22 ppm, the "mm triad" occurs, which is assigned to the methyl groups having methyl groups directly adjacent on the left and right
2. At a chemical shift of about 20.2 to 21 ppm, the "mr triad" occurs, which is assigned to the methyl groups having methyl groups directly adjacent on the left or right.
3. At a chemical shift of about 19.3 to 20 ppm, the "rr triad" occurs, which is assigned to the methyl groups without directly adjacent methyl groups.

The intensities of the assigned signal groups are determined as the integral of the signals. The chain isotacticity index is defined as follows:

$$II\ triads = \frac{J_{mm} + 0.5\ J_{mr}}{J_{mm} + J_{mr} + J_{rr}} \cdot 100$$

where $J_{mm}$, $J_{mr}$ and $J_{rr}$ are the integrals of the assigned signal groups.

Case B:

In the $^{13}$C-NMR spectrum of an ethylene-propylene copolymer, the chemical shift of the methyl groups of interest is in the range from 19 to 22 ppm. The spectrum of the methyl groups can be divided into three blocks. In these blocks, the $CH_3$ groups appear in triad sequences, whose assignment to the local environments is explained in greater detail below:

Block 1:

$CH_3$ groups in the PPP sequence (mm triad)

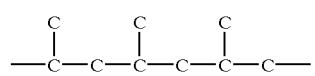

Block 2:

$CH_3$ groups in the PPP sequence (mr or rm triad)

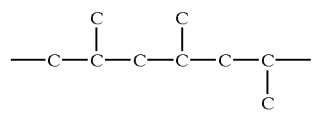

and $CH_3$ groups in the EPP sequence (m chain):

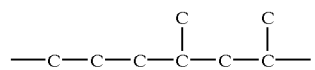

Block 3:

$CH_3$ groups in the PPP sequence (rr triads):

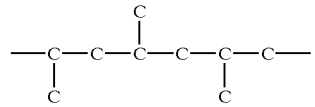

CH₃ groups in an EPP sequence (r chain):

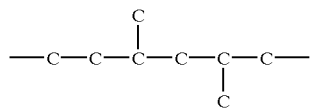

CH₃ groups in an EPE sequence:

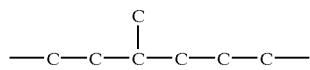

In the determination of the triad-related chain isotacticity index II (triads) of the n-heptane-insoluble content of an ethylene-propylene copolymer, only PPP triads were considered, i.e. only those propylene units which lie between two adjacent propylene units (cf. also EP-B-0 115 940, page 3, lines 48 and 49).

The definition of the triad isotacticity index of an ethylene-propylene copolymer is:

II(triads)=100×($J_{mm}/J_{ppp}$)

Calculation of the chain isotacticity index of an ethylene-propylene copolymer.
1. $J_{mm}$ is given by the peak integral of block 1.
2. Calculate the integral ($J_{total}$) of all methyl group peaks in blocks 1, 2 and 3.
3. By simple considerations, it is possible to show that $J_{ppp}=J_{total}-J_{EPP}-J_{EPE}$.

Sample Preparation and Measurement:
60 to 100 mg of polypropylene are weighed into a 10 mm NMR tube, and hexachlorobutadiene and tetrachloroethane in a mixing ratio of about 1.5:1 are added until a fill level of about 45 mm has been reached. The suspension is stored at about 140° C. until (generally after about one hour) a homogeneous solution has formed. In order to accelerate the dissolution process, the sample is stirred from time to time with a glass rod.

The ¹³C-NMR spectrum is recorded at elevated temperature (generally 365 K) under standard measurement conditions (semi-quantitative).

References

W. O. Crain, Jr., A. Zambelli, and J. D. Roberts, Macromolecules, 43 330 (1971)

A Zambelli, G. Gatti, C. Sacchi, W. O. Crain, Jr., and J. D. Roberts, Macromolecules, 4, 475 (1971)

C. J. Carman and C. E. Wilkes, Rubber Chem. Technol. 44, 781 (1971)

TABLE 1

| Examples | Respective interlayer thickness in μm | Wax content in the raw-material mixture of the interlayer in % by weight | Calculated resin content in % by weight, based on the total weight of the film (resin in the base layer) | Calculated wax content in % by weight, based on the total weight of the film (wax in the interlayer) | Permeation coefficient in accordance with DIN 53122 at 38° C. and 90% relative humidity g 20 μm/100 in² 24 h |
|---|---|---|---|---|---|
| E1 | 1.5 | 7.0 | 0 | 1.0 | 0.32 |
| E2 | 1.5 | 10.0 | 0 | 1.5 | 0.20 |
| E3 | 1.5 | 13.3 | 0 | 2.0 | 0.18 |
| E4 | 3.0 | 13.3 | 0 | 4.0 | 0.14 |
| E5 | 1.5 | 20.0 | 0 | 3.0 | 0.18 |
| E6 | 3.0 | 20.0 | 0 | 6.0 | 0.12 |
| E7 | 1.5 | 27.0 | 0 | 4.0 | 0.13 |
| E8 | 1.5 | 7.0 | 10 | 1.0 | 0.20 |
| E9 | 1.5 | 7.0 | 5 | 1.0 | 0.24 |

TABLE 2

| Comparative Examples | Respective interlayer thickness in μm | Calculated resin content in % by weight, based on the total weight of the film (resin in the base layer) | Calculated wax content in % by weight, based on the total weight of the film (wax in the interlayer) | Permeation coefficient in accordance with DIN 53122 at 38° C. and 90% relative humidity g 20 μm/100 in² 24 h |
|---|---|---|---|---|
| CE1 | 0 | 0 | 0 | 0.37 |
| CE2 | 0 | 5 | 0 | 0.29 |
| CE3 | 0 | 8 | 0 | 0.27 |
| CE4 | 0 | 10 | 0 | 0.25 |
| CE5 | 0 | 0 | 1 | 0.37 |
| CE6 | 0 | 0 | 2 | 0.35 |
| CE7 | 0 | 0 | 3 | 0.30 |
| CE8 | 0 | 0 | 4 | 0.20 |

What is claimed is:

1. A multilayer, biaxially oriented polypropylene transparent film comprising a base layer, said base layer having a weight, said base layer being formed from an isotactic homopolymer comprising a hydrocarbon resin in an amount of from 1 to 20% by weight based on said weight of said base layer, the film further including at least one heat-sealable top layer and at least one interlayer in accordance with a BZD layer structure, wherein the interlayer comprises a wax in an amount of from 5 to 40% by weight, said wax having a mean molecular weight Mn of from 200 to 1200, said at least one top layer being formed from a polymer taken from the group consisting of an isotactic propylene homopolymer, a propylene copolymer, or a propylene terpolymer, and said interlayer being formed from an isotactic propylene homopolymer.

2. A polypropylene film as claimed in claim 1, wherein the wax of the interlayer is in an amount of from 5 to 30% by weight based on the weight of the interlayer.

3. A polypropylene film as claimed in claim 1, wherein the wax is a polyethylene wax having an Mw/Mn of from 1 to 2.

4. A polypropylene film as claimed in claim 1, wherein the wax is a macrocrystalline paraffin (paraffin wax) or a microcrystalline paraffin (microwax).

5. A polypropylene film as claimed in claim 1, wherein the interlayer has a thickness of from 0.2 to 10 μm.

6. A polypropylene film as claimed in claim 1, wherein the Interlayer comprises a highly isotactic propylene homopolymer having a chain isotacticity index of the n-heptane-insoluble content, determined by $^{13}$C-NMR spectroscopy, of at least 95%.

7. A polypropylene film as claimed in claim 1, which has a heat-sealable top layer of the olefinic polymers on both sides.

8. A polypropylene film as claimed in claim 1, wherein wax-containing interlayers of olefinic polymers are applied to both sides between the base layer and the interlayer(s).

9. A polypropylene film as claimed in claim 1, which has a matt top layer.

10. A polypropylene film as claimed in claim 1, wherein the base layer comprises a highly isotactic propylene homopolymer having a chain isotacticity index of the n-heptane-insoluble content, determined by $^{13}$C-NMR spectroscopy, of at least 95%.

11. A polypropylene film as claimed in claim 1, wherein the base layer comprises an antistatic.

12. A polypropylene film as claimed in claim 1, wherein the film is transparent and has a thickness of from 4 to 80 μm.

13. A polypropylene film as claimed in claim 1, wherein the film is opaque and/or white and has a light transparency of at most 70%.

14. A polypropylene film as claimed in claim 13, wherein the film has a vacuole-free interlayer.

15. A polypropylene film as claimed in claim 1, wherein the top layer(s) comprise(s) lubricants and antiblocking agents.

16. A polypropylene film as claimed in claim 1, wherein all layers of the film comprise neutralizer and stabilizer.

17. A process for the production of a polypropylene film as claimed in claim 1, wherein the orientation in the longitudinal direction is carried out with a longitudinal stretching ratio of from 5:1 to 9:1 and the orientation in the transverse to direction is carried out with a transverse stretching ratio of from 5:1 to 10:1.

18. A method for forming a multilayer, biaxially oriented polypropylene transparent film for use as a packing film, the method comprising the steps of forming a film having a base layer, at least one top layer and at least one interlayer, said base layer having a weight, said base layer being formed from an isotactic homopolymer comprising a hydrocarbon resin in an amount of form 1 to 20% by weight based on said weight of said base layer, said at least one top layer being a heat-sealable layer, and said at least one interlayer being formed in accordance with a BZD layer structure, wherein the interlayer comprises a wax in an amount of from 5 to 40% by weight, said wax having a mean molecular weight Mn of from 200 to 1200, said at least one top layer being formed from a polymer taken from the group consisting of an isotactic propylene homopolymer, a propylene copolymer, or a propylene terpolymer, and said at least one interlayer being formed from an isotactic propylene homopolymer.

19. The method of claim 18, wherein said packing film is usable as a wrapping film.

* * * * *